United States Patent [19]
Reiter et al.

[11] Patent Number: 5,724,431
[45] Date of Patent: Mar. 3, 1998

[54] ZINC-AIR DRY CELL HOLDER AND HEARING AID THAT USES IT

[75] Inventors: James J. Reiter, Champlin; Gordon Berkholcs, Minneapolis, both of Minn.

[73] Assignee: Siemens Hearing Instruments, Inc., Piscataway, N.J.

[21] Appl. No.: 606,935

[22] Filed: Feb. 26, 1996

[51] Int. Cl.⁶ .................................................. H04R 25/00
[52] U.S. Cl. ........................... 381/69.2; 381/69; 429/27
[58] Field of Search ........................... 381/69.2, 69, 68, 381/68.6, 68.7, 23.1; 429/86, 89, 96, 100, 27

[56] References Cited

U.S. PATENT DOCUMENTS

| | | |
|---|---|---|
| 4,965,831 | 10/1990 | Schmid .................................. 381/68.7 |
| 5,069,986 | 12/1991 | Dworkin et al. ........................ 429/27 |
| 5,133,016 | 7/1992 | Clark .................................... 381/69.2 |
| 5,187,746 | 2/1993 | Narisawa ............................... 429/100 |
| 5,191,274 | 3/1993 | Lloyd et al. ............................ 429/27 |
| 5,431,575 | 7/1995 | Engira .................................. 429/100 |
| 5,532,080 | 7/1996 | Mizoguchi et al. ..................... 429/100 |

FOREIGN PATENT DOCUMENTS

91/08597  6/1991  WIPO.

*Primary Examiner*—Huyen D. Le
*Attorney, Agent, or Firm*—Mark H. Jay, Esq.

[57] ABSTRACT

A holder hermetically seals less than all of the air holes in a zinc-air dry cell and allows air to reach at least of the air holes. This greatly lengthens the lifespan of a zinc-air dry cell.

3 Claims, 3 Drawing Sheets

ZINC-AIR DRY CELL HOLDER AND HEARING AID THAT USES IT

BACKGROUND OF THE INVENTION

The invention relates to zinc-air dry cells, and more particularly relates to holders for zinc-air dry cells that permit the cells to operate for long periods of time. In another and particularly advantageous aspect, the invention relates to long-life hearing aids for use in nursing homes.

A size 675 HP-type zinc-air dry cell as manufactured by Rayovac Corporation (Madison, Wis.) has six air holes in its cathode can. At the factory, these holes are covered by a protective tab. When the dry cell is to be used, the tab is pulled off to uncover the holes and to permit air to enter the dry cell. The presence of air within the dry cell causes a chemical reaction to take place. This reaction in turn causes a potential difference to come about between the anode and the cathode of the dry cell, thereby causing the dry cell to produce electricity.

Such a zinc-air dry cell has a limited lifespan once the protective tab has been pulled off. This is because the above-referenced chemical reaction continues even when there is no electrical load between the anode and the cathode of the dry cell. For example, a size 675 HP-type zinc-air dry cell as manufactured by Rayovac Corporation will become unusable after approximately 1000 hours, even in the absence of a load.

The invention proceeds from the realization that the limited lifespan of a zinc-air dry cell comes about because of a design requirement that is ordinarily applicable to such cells. Zinc-air dry cells are designed to produce high peak currents without substantial reduction in voltage. This in turn requires that comparatively large volumes of air be made available to the interior of the dry cell. To accomplish this, the air holes are comparatively numerous and are comparatively large.

In accordance with the invention, a holder is provided for use with zinc-air dry cells of the type in which a plurality of air holes are located in the cathode. The holder seals off some but not all of the air holes and permits air to reach at least one of the air holes. This diminishes the rate at which the dry cell degrades in the absence of a load, because the rate of the chemical reaction within the dry cell is reduced by the reduced volume of air available for the reactants. The lifespan of the dry cell is thereby greatly prolonged.

Such a holder is particularly valuable and advantageous when used in a hearing aid. Elderly patients in nursing homes often need hearing aids. Such aids are powered by dry cells. Such dry cells must be replaced periodically, e.g. every 4 to 14 days. Because the dry cells are rather small and it requires some dexterity to remove a spent dry cell from a hearing aid and to replace the cell with a new one, it often falls to nursing home personnel (nurses, aides) to change the dry cells. This is tedious and time consuming. It would be highly advantageous to provide a hearing aid which could operate off a single dry cell for a prolonged period of time. (Such a hearing aid will be referred to hereinafter as a "long-life hearing aid".) When a hearing aid is powered by a zinc-air dry cell retained in a holder according to the invention, the hearing aid can last as long as 130 days (at 16 hours/day operation) or 116 days (at 18 hours/day operation).

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Figure 1A:
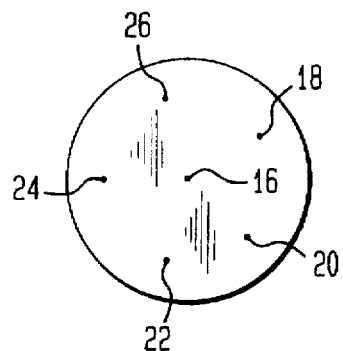
FIGS. 1A and 1B show a conventional zinc-air dry cell.
Figure 1B:
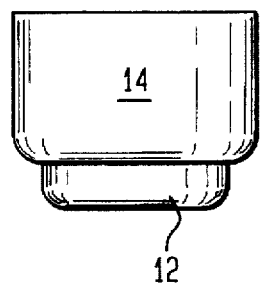

A conventional zinc-air dry cell 10 such as is illustrated in FIGS. 1A and 1B has an anode 12 and a cathode 14. There are six air holes 16, 18, 20, 22, 24 and 26 in the cathode 14; in this example the air holes 18–26 form the vertices of a pentagon and the air hole 16 is located at the center of the pentagon and at the center of the dry cell 10. (Neither the number nor the pattern of the air holes is a part of the invention.)

In accordance with the invention, some of the air holes 16–26 are blocked off and at least one is left unobstructed so air can reach it. In the preferred embodiment, the air hole 16 is the unobstructed one, but this is for convenience. Any other air hole 18–26 could be chosen instead.

Figure 2A:
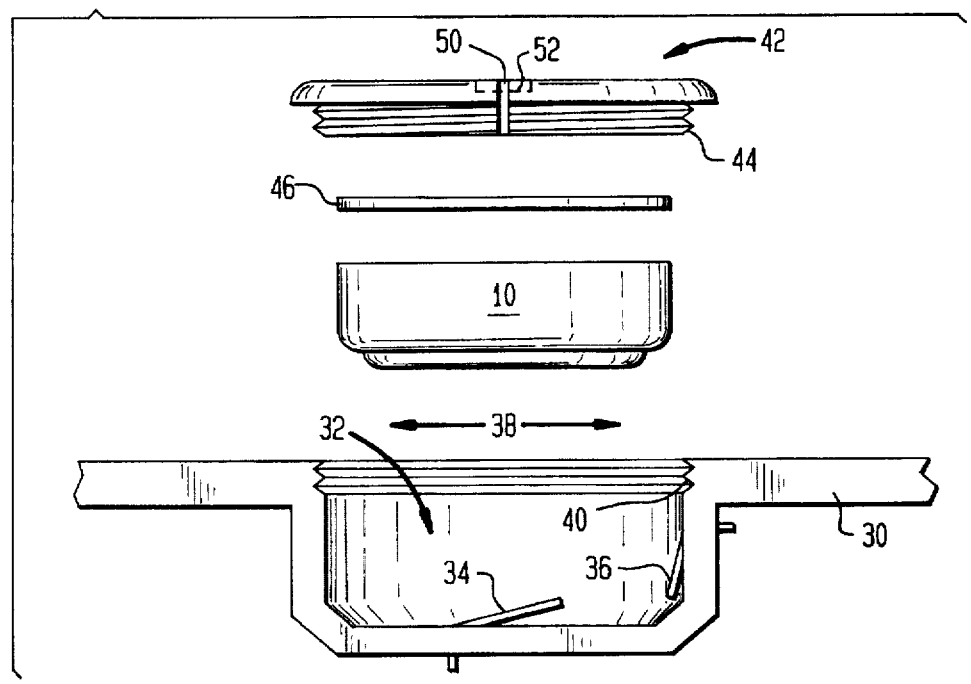
FIG. 2A is an exploded view of a holder in accordance with the invention.
Figure 2B:
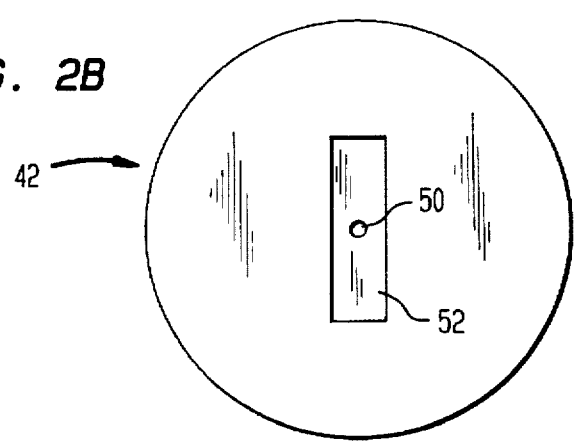
FIGS. 2B and 2C are, respectively, top and bottom views of the cover of the FIG. 2A holder.
Figure 2C:
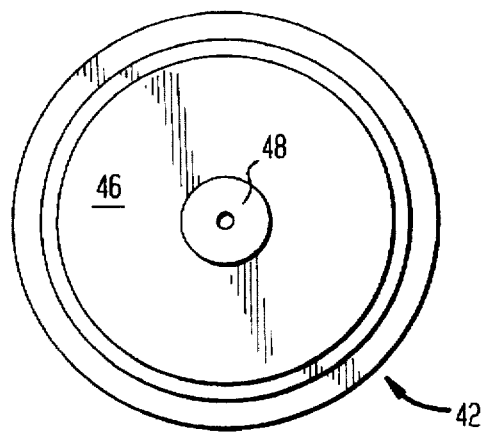

A holder in accordance with the invention is shown in FIGS. 2A, 2B and 2C. A housing 30 of e.g. nylon has a recess 32 shaped to fit the zinc-air dry cell 10. A spring-type anode electrode 34 and a spring-type cathode electrode 36 are mounted in the housing 30 and are so located that when a zinc-air dry cell 10 is located in the recess 32, the electrode 34 contacts the anode 12 and the electrode 36 contacts the cathode 14.

The recess 32 has an open end 38. At the open end 38, the housing 30 has an interior thread 40. A disk-shaped cover 42 has an exterior thread 44 that engages the interior thread 40 and that permits the cover 42 to be screwed into the housing 30 to close off the recess 32 and retain a dry cell 10 therein.

A gasket 46 made of air-impermeable material (e.g. silicone) is retained in a corresponding recess in the bottom surface of the cover 42. The gasket 46 has a central opening 48, and the cover 42 has a central air port 50 that is unobstructed by the opening 48.

When the protective tab (not shown) on a zinc-air dry cell such as is illustrated in FIGS. 1A and 1B has been removed, the holes 16–26 are exposed to the air. When the dry cell is then placed within the recess 32 and the cover 42 is screwed into the housing 30, the gasket 46 hermetically seals the holes 18–26 but air can still reach the hole 16 through the air port 50 and the opening 48 in the gasket 46. This causes the chemical reaction within the dry cell 10 to proceed less rapidly, and increases the lifespan of the dry cell 10.

Advantageously but not necessarily, the top of the cover 42 has a slot 52. This permits a user to use a coin (e.g. a penny) to screw the cover 42 into and out of the housing 30.

A hearing aid in accordance with the invention has a microphone 54, a receiver 56 and a hearing aid circuit 58. (The details of the circuit 58 are not part of the invention. The circuit 58 is shown to be connected to a variable resistance 59 that serves as a volume control because the preferred embodiment of a hearing aid in accordance with the invention has such a volume control, but this is not necessary.) This electronic system is powered by the battery 10, which is connected to the circuit 58 using the electrodes 34 and 36.

Figure 3:
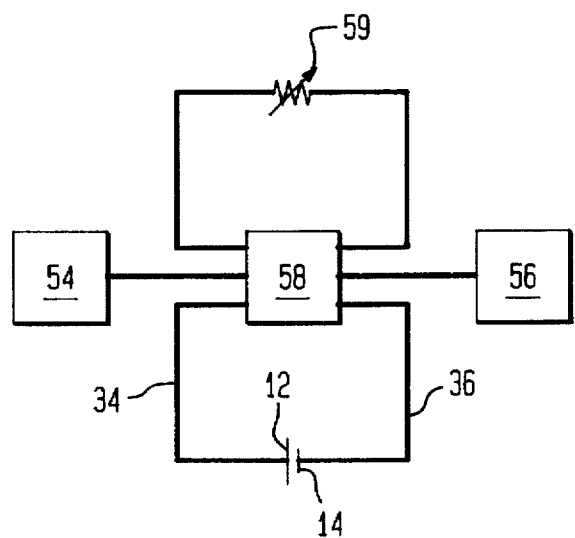
FIG. 3 is a block diagram of the electronics in a hearing aid in accordance with the invention.
Figure 4:
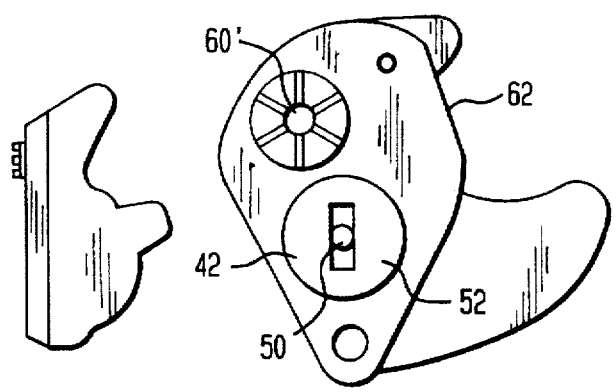
FIG. 4 is a drawing of a first preferred embodiment of a hearing aid in accordance with the invention.
Figure 5:
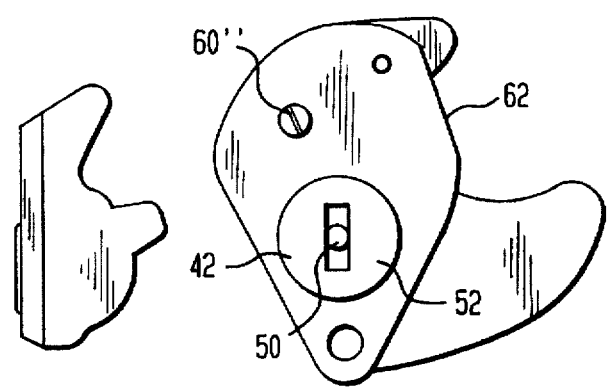
FIG. 5 is a drawing of a second preferred embodiment of an hearing aid in accordance with the invention.
Figure 6:
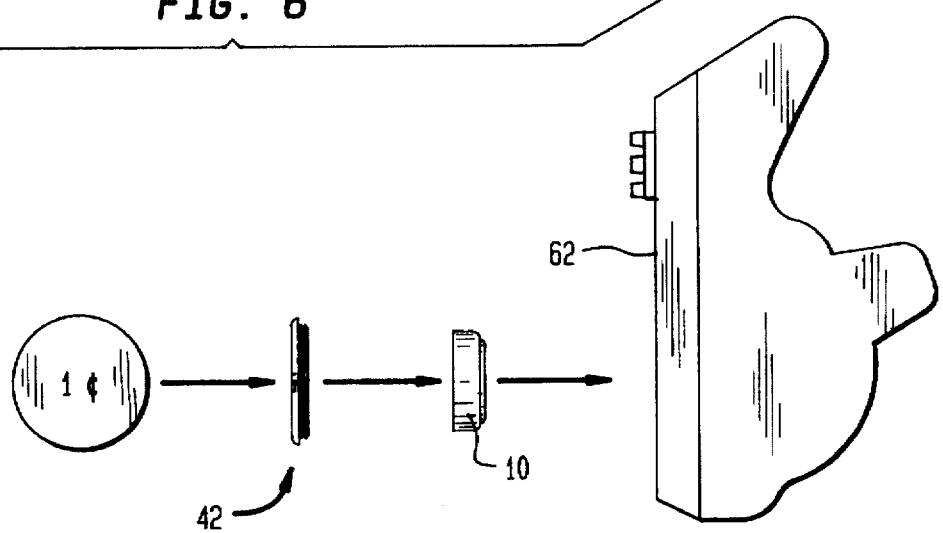
FIG. 6 is an exploded view showing how a dry cell can be installed in the first preferred embodiment shown in FIG. 4.

In the preferred embodiment of a hearing aid in accordance with the invention, the circuitry shown in FIG. 3 and the zinc-air battery 10 are contained within a housing 62 of the in-the-ear (ITE) type. This is not necessary; a behind-the-ear (BTE) type of hearing aid could be used instead. In the embodiment shown in FIG. 4, the volume control 60' is a finger-operable knob; in the embodiment shown in FIG. 5, the volume control 60" is screwdriver-adjustable.

In a test carried out using a type 9446 microphone (Microtronic A/S, Rofkilde, Denmark) for the microphone 54, a type ES3171 receiver (Knowles, Inc., Itasca IL) for the receiver 56 and a GS563 hybrid amplifier (a proprietary product made for Rexton, Inc. of Plymouth Minn. and Siemens Hearing Instruments, Inc. of Piscataway N.J.) for the circuit 58, and using a size 675 HP-type zinc-air dry cell (Rayovac Corporation), the dry cell lasted for 2088 hours of continuous use. This corresponds to 130 16-hour days of use or 116 18-hour days of use.

Although a preferred embodiment has been described above, the scope of the invention is limited only by the following claims:

We claim:

1. A holder for use with a zinc-air dry cell of the type in which a plurality of air holes are located in the cathode, comprising:

a housing having a recess shaped to fit the zinc-air dry cell, said recess having an open end, and the housing having an interior thread at the open end of the recess;

anode and cathode electrodes extending into the recess and positioned to contact the anode and cathode of the dry cell introduced therein through the open end;

a cover that is detachably securable to the housing to cover the open end of the recess and to retain the dry cell therein, the cover having a mating exterior thread for being threaded into said open end and an air port for allowing air to enter the recess, said air port being aligned with at least one air hole in the dry cell located in the recess; and partially air-permeable sealing means, the sealing means cooperating with the housing and the cover to hermetically seal less than all of said plurality of air holes and thereby prevent air from entering the dry cell therethrough and to permit air to enter at least one of said plurality of air holes, thereby causing the dry cell to produce a potential difference between its anode and its cathode, said sealing means comprising a gasket having a perforation that is aligned with said air port and said at least one air hole when the dry cell is located in the recess.

2. A long-life hearing aid for use with a zinc-air dry cell of the type in which a plurality of air holes are located in the cathode, comprising:

a microphone, a receiver, and electronic circuitry connected together in operative relation to amplify sound;

a housing containing the microphone, receiver, and circuitry and having a recess shaped to fit the zinc-air dry cell, said recess having an open end, the housing having an interior thread at the open end of the recess;

anode and cathode electrodes extending into the recess and positioned to contact the anode and cathode of the dry cell introduced therein through the open end, said electrodes being operatively connected to the microphone, receiver, and circuitry to provide electrical power thereto;

a cover that is detachably securable to the housing to cover the open end of the recess and to retain the dry cell therein, the cover having a mating exterior thread for being threaded into said open end and an air port for allowing air to enter the recess, said air port being aligned with at least one air hole in the dry cell located in the recess; and partially air-permeable sealing means, the sealing means cooperating with the housing and the cover to hermetically seal less than all of said plurality of air holes and thereby prevent air from entering the dry cell therethrough and to permit air to enter at least one of said plurality of air holes, thereby causing the dry cell to produce a potential difference between its anode and its cathode, said sealing means comprising a gasket having a perforation that is aligned with said air port and said at least one air hole when the dry cell is located in the recess.

3. The hearing aid of claim 2, wherein the housing is of an in-the-ear (ITE) type.

* * * * *